United States Patent [19]

Hsu

[11] Patent Number: 5,100,864
[45] Date of Patent: Mar. 31, 1992

[54] PROCESS FOR PREPARING SUPERCONDUCTIVE FIBERS OF HIGH DENSITY

[75] Inventor: Che-Hsiung Hsu, Wilmington, Del.

[73] Assignee: E. I. Du Pont de Nemours and Company, Wilmington, Del.

[21] Appl. No.: 315,294

[22] Filed: Feb. 24, 1989

[51] Int. Cl.⁵ .......................................... H01L 39/12
[52] U.S. Cl. ........................................ 505/1; 264/65; 264/211.11; 505/740
[58] Field of Search ................... 264/29.2, 56, 63, 82, 264/83, 211, 211.11, 211.12, 65; 505/704, 740, 780, 1, 734, 737; 501/95

[56] References Cited

U.S. PATENT DOCUMENTS 4,975,415  12/1990  Gusman et al.

FOREIGN PATENT DOCUMENTS 035643  6/1987  Japan .................................. 505/740
244553  12/1987  Japan .................................. 505/740

OTHER PUBLICATIONS

Goto et al., "Wet Spinning ... Y-BA-CU-O Superconductor" *Journal of Materials Letters* Mar. 1988.

*Primary Examiner*—James Lowe
*Assistant Examiner*—Christopher A. Fiorilla
*Attorney, Agent, or Firm*—John A. Parrish

[57] ABSTRACT

Process for preparing superconductive fiber from a dispersion of a particulate precursor of a superconductive oxide in a solution of an organic polymer in an organic solvent. The process includes the steps of forming a spinnable dispersion of the precursor in the solution, extruding the dispersion into fiber, and firing the fiber at a temperature of at least 950° C. to form superconductive fiber.

4 Claims, No Drawings

PROCESS FOR PREPARING SUPERCONDUCTIVE FIBERS OF HIGH DENSITY

BACKGROUND OF THE INVENTION

Superconductive compositions having the formula

$MBa_2Cu_3O_x$ where M is selected from the group consisting of Y, Nd, Sm, Eu, Gd, Dy, Ho, Er, Tm, Yb and Lu, and x is from about 6.5 to 7.0 have been subjected to intensive investigation. It is expected that such compositions will find extensive use in a number of practical applications. For use in magnets and power transmission lines, it will be important that such materials be in the form of fibers (also referred to as wires) of high critical current densities ($J_c$).

SUMMARY OF THE INVENTION

This invention provides a novel process for preparing superconductive fiber of improved critical current density and consisting of $MBa_2Cu_3$ superconductive oxide where M is a metal selected from the group of Y, Nd, Sm, Eu, Gd, Dy, Ho, Er, Tm, Yb and Lu, comprising forming a spinnable dispersion of a chemically homogeneous particulate of an amorphous compound of M, a copper oxide and barium carbonate in proportions such that the atomic ratio of M:Ba:Cu is 1:2:3, in a solution of an organic polymer in an organic solvent, said dispersion containing at least 70 weight percent of particulate based on the total of polymer and particulate, extruding the dispersion into fiber, and firing it at temperatures in excess of 950° C., preferably above 1000° C., to obtain a superconductive fiber.

DETAILED DESCRIPTION OF THE INVENTION

The present invention provides fibers with high critical current densities ($J_c$). Basically, the invention involves the preparation of a solution of an organic polymer in an organic solvent and dispersing a defined particulate therein. The solution can comprise one or more organic polymers in an organic solvent; however, it is important that the solution be of sufficient viscosity to be spinnable, i.e., to permit extrusion through a spinneret to form fiber. Polyethylene and polyurethane is specifically illustrated herein, but other fiber-forming organic polymer such as polymethylmethacrylate, polystyrene or polyacrylonitrile of appropriate viscoelastic properties suitable for spinning from solution may be employed. Useful organic polymer solvents would include dimethylformamide (DMF), tetrahydrofuran (THF), xylene, toluene, dimethylacetamide (DMAc), etc. Those skilled in the art will be aware of appropriate polymer-solvent combinations and in appropriate proportions to yield solutions suitable for spinning. Preferred polymer-solvent combinations are polyethylene-xylene, and polyurethane-DMAc. Not only do such compositions lead to desirable superconducting fibers but they also are excellent for obtaining flexibility in the green or unfired state.

To the polymer solution is added particulate superconductive oxide precursor in which the metals and their atomic ratio are the same as in the desired superconductive oxide. The particles to be added should be chemically homogeneous and of micron to submicron size, suitable for dispersing in the polymer solution and spinning. Preferably, they should be present in the polymer solution at the highest possible particle concentration which can form and maintain a spinnable dispersion. After spinning and removal of solvent, the resulting fiber should contain at least 70 weight percent superconductive-oxide precursor, preferably between 80 and 90 weight percent, most preferably greater than 90 weight percent based on a total weight of superconductive oxide precursor and polymer.

A precursor containing an amorphous M oxide, CuO and barium carbonate has been found to give improved critical current density. It can be prepared by blending an aqueous mixture of M acetate, preferably yttrium acetate, copper acetate and a source of barium selected from barium hydroxide and barium acetate, removing excess water and calcining the product in air by heating to a temperature in the range of 450° C. to 750° C. and maintaining that temperature for at least one hour, generally as described in copending and coassigned U.S. application Ser. No. 07/296,075, filed Jan. 12, 1989 now abandoned, to Connolly et al. The particulate material is then dispersed in the polymer solution and the mix is extruded through a spinneret to form fiber. Solvent is removed and the fiber is fired in an oxygen-containing atmosphere, such as air, but preferably oxygen itself. Firing temperatures of at least 950° C., preferably from about 1000° C. and up to about 1025° C. have yielded products with significantly greater $J_c$ than those obtained at lower firing temperatures. Excessive melting occurs above 1025° C.

The resulting fibers represent useful forms of the superconductive oxides for magnetic, power transmission or other devices.

PROCEDURES

Critical Current Density ($J_c$) is defined as the threshold current which, when passed through a given cross-sectional area of a superconductor, transforms the material from the superconductive state to a normal state. The measurement is done using a 4-probe method known in the art. A silver paste is used as electrode material to reduce contact resistance to about 5 ohm. The two inner electrodes are about 6 mm apart. While the fiber is immersed in liquid nitrogen, current is applied to the two outer electrodes. The voltage corresponding to the current applied through the two outer electrodes is measured between the two inner electrodes with an electrometer. As current is increased, a point is reached where the sample is driven to the normal state. The threshold current is defined as the current corresponding to a voltage of 1 microvolt. The threshold current normalized with the cross-section of the fiber sample is defined as Jc.

The following examples are illustrative of the invention and are not to be construed as limiting. EXAMPLES 1 and 3 are controls illustrative of the less desirable low temperature firing procedure while EXAMPLES 6 and 7 are controls which demonstrate the less preferred practice of using superconductive oxide rather than a precursor thereof.

EXAMPLE 1

A dispersion was prepared as follows: 13.6 g polyurethane solution (containing 36 weight percent polymer in DMAc as described in U.S. Pat. No. 4,296,174, column 5, lines 32 to 56, but with a molar ratio of ethylenediamine and 1,3-cyclohexylenediamine chain extenders of 90/10 instead of 80/20 and the molar ratio of p,p'-methylenediphenyl diisocyanate and polytetramethylene ether glycol was 1.62 instead of 1.70) was added to 27.8 g dry DMAc. The mixture was heated to 50° C. in an oven to obtain a homogeneous solution. To the solution, 80.0 g of a superconductive oxide precursor prepared as described below and an additional 41.7 g of polyurethane solution were added with constant stirring. The mixture was kept at 50° C. to maintain a homogeneous dispersion.

The dispersion was then loaded into a twin-cell spin unit and the spin mix was pumped between the two cells for three hours to obtain good mixing. After mixing, the spin mix was then pumped into the spinning cell through a deaeration plate and extruded through a 20 mil hole spinnerette into a trough containing methanol to remove the DMAc and coagulate the fibers. The fibers were then wound up on bobbins for drying. The ~0.30 mm-diameter, dried fibers are very flexible.

Small pieces (~8 cm long) were cut and placed in alumina boats. The alumina boats were put in a Quartz container for firing in a Fisher #497 furnace. The container was fed with oxygen during the entire firing cycle at a rate of 1.5 SCFH (standard cubic feet per hour). The firing cycle is as follows: heating from room temperature (RT) to 160° C. at 1° C./minute, 1 hour at 160° C., 2° C./minute to 850° C., ½ hour at 850° C., 2° C./minute to 925° C., 1 hour at 925° C., cooling to 600° C. at 5° C./minute, 1 hour at 600° C., 5° C./minute to 300° C., 1 minute at 300° C., and 5° C./minute to RT. The fired sample is superconductive with a Jc of 94 amps/cm$^2$ at 77° K.

The precursor to the superconductive oxide is prepared as follows:

(a) Copper acetate monohydrate (230.0g) was dissolved in 1.6 liter of purified water at about 75° C. forming a cloudy blue-green solution. To this was added a clear solution of yttrium acetate hydrate—128.6 g dissolved in 0.6 liter of purified water at 75° C. A cloudy barium hydroxide solution (containing some white precipitate after its preparation by heating 242.2 g of barium hydroxide octahydrate in 0.8 liter of purified water at 75° C.) was added to the yttrium/copper mixture over a period of 5 minutes. The resulting brownish mixture was maintained at 75° C. for 1 hour after which the water was evaporated by "spray" drying using a Buchi 190 mini spray dryer with a 0.7 mm nozzle.

(b) The dry powder from one or two batches at a time from procedure (a) was calcined in air, i.e., in an oxygen-containing atmosphere, according to the following heating cycle: 100° C.—1 hr, 20° C. every 5 min. to 240° C., 5° C. every 10 min. to 270° C., 20° C. every 5 min. to 320° C., 10° C. every 10 min. to 500° C., 500° C.—1 hr, then slowly cooled to room temperature. The calcined material is an intimate and homogeneous blend of stable $BaCO_3$, $CuO$ and amorphous yttrium compounds.

(c) Seven batches treated as in (a) and (b) were hammermilled together to form a large lot. This lot was combined with six more batches and hammermilled to form an even larger lot. From this larger lot the precursor powder for this Example was taken.

EXAMPLE 2

A long piece (~45 cm) of the unfired fiber described in the Example 1 was used. One end of the fiber was taped to a metal rod. The rod was mounted horizontally to a post which has a knob for adjusting height of the rod. The base of the post was placed on the top of the Fisher #497 furnace. The sealed end of a Quartz tube (2.2 cm o.d., 37 cm long) was inserted through the vent hole on the top center of the furnace until it rested on the bottom of the furnace. The free end of the fiber was inserted through the tube and advanced until it was about 2 cm above the bottom of the tube. Precaution was taken to ensure that the fiber was not in contact with the tube wall to avoid sticking at high temperatures. The tube was fed with oxygen at a rate of 1.0 SCFH through a side tube. Except for the difference in $T_{max}$ (1000° C. vs. 925° C.), the firing cycle programmed in the furnace was identical to the one described in EXAMPLE 1. The suspended fiber did not break during the entire firing cycle. With the higher firing temperature (1000° C. vs. 925° C.) the properties of the fired fiber were substantially improved. At 77° K, the fired fiber has a Jc of 653 vs. 94 amps/cm$^2$ in EXAMPLE 1. Scanning electron microscope (SEM) photographs of the fracture surface illustrating the fiber cross-section show a much denser fiber than that of EXAMPLE 1. A measurement of the Meissner effect shows that the fiber starts to exclude magnetic flux at 95° K and almost completely excludes flux at 80° K. The transition is extremely sharp.

EXAMPLE 3

A dispersion was prepared as follows: 6 g polyethylene (Holstalen Gur412, 4.5 million molecular weight) and 54 g of the precursor of EXAMPLE 1 were mixed with 114 g xylene in a resin kettle. The resin kettle was immersed in a 165° C. oil bath. The mixture was constantly stirred till a homogeneous solution was formed. The bath temperature was lowered to 135° C. before removal of the kettle. The spin mix was then transferred to a 135° C. preheated spin cell containing a filtration pack (1×50-mesh/1×20-mesh) and a 81-mil hole spinnerette. The spin cell was kept at 135° C. during the spinning. The extruded fibers were then quenched with water in a bath situated 2 cm below the spinnerette face. The quench exposure length is 24 cm. The quenched fibers were then wound up on bobbins at a speed of 3.5 meters per minute. Fibers from the bobbin were air dried to remove quench water and xylene solvent. The ~0.8 mm-diameter dried fibers are very flexible.

Small pieces (~8 cm long) were cut for oxygen firing according to the procedure and firing cycle described in EXAMPLE 1. The fired sample is superconductive and has a Jc of 101 amps/cm$^2$ at 77° K.

EXAMPLE 4

A long piece (~45 cm) of the unfired fiber sample described in EXAMPLE 3 was mounted in the Fisher #497 furnace according to the manner described in EXAMPLE 2. The cycle used for the firing was as follows: RT to 160° C. at 1° C./minute, 1 hour at 160° C., 1° C./minute to 1000° C., 1 hour at 1000° C., 1° C./minute to 1023° C., quickly cooled down to 950° C., 1 hour at 950° C., 5° C./minute to 600° C., 1 hour at 600° C., 5° C./minute to 300° C., 1 minute at 300° C., 5° C./minute to RT. The suspended fiber did not break during the entire firing cycle. The $T_{max}$ of 1023° C. is just below the fiber melting temperature. If this temperature were exceeded, there exists the danger of the fiber breaking under its own weight. The current carrying properties of the fired fiber were substantially improved with the higher firing temperature (1023° C. vs. 925° C.

in EXAMPLE 3). At 77° K. the fiber has a Jc of 591 vs. 101 amps/cm$^2$ in EXAMPLE 3. SEM photographs of the fracture surface of the fiber cross-section show much denser fiber than obtained in EXAMPLE 3.

EXAMPLE 5

A long piece (~45 cm) of the unfired fiber sample described in EXAMPLE 3 was mounted in the Fisher #497 furnace in the manner described in EXAMPLE 2. The cycle used for the firing was as follows: RT to 160° C. at 1° C./minute, 1 hour at 160° C., 1° C./minute to 850° C., ½ hour at 850° C., 1° C./minute to 1000° C., 1 hour at 1000° C., cooled down to 600° C. at 5° C./minute, 1 hour at 600° C., 5° C./minute to 300° C., 1 minute at 300° C., 5° C./minute to RT. The suspended fiber did not break during the entire cycle. The fired fiber has a Jc of 676 amps/cm$^2$ at 77° K. Once again higher temperature firing (1000° C. vs 925° C.) produced higher Jc fibers (see EXAMPLE 3 for comparison).

EXAMPLE 6

Superconductive oxide powder was prepared by blending three YBa$_2$Cu$_3$ superconductive oxide batches (A, B and C) in a grinding mill (Vortac). The major phase in all three batches was determined by x-ray analysis to contain Y/Ba/Cu in a ratio of 1/2/3. Only trace amounts of other phases were found.

To prepare Batch "A", 211.8g Y$_2$O$_3$, 980.1g Ba(NO$_3$)$_2$ and 447.6g CuO were dry mixed (Hockmeyer mixer) and placed in two trays (Coors Aluminaware). The mixture was calcined for 3 hours at about 970° C. under an oxygen atmosphere. The temperature was lowered to 500° C. and held 1 hour before cooling to room temperature. This batch was then ground in a stainless steel Waring blender.

In Batch "B" the same amounts of Y$_2$O$_3$, Ba(NO$_3$)$_2$ and CuO were mixed on the Hockmeyer using as little water as possible to form a smooth paste. The paste mixture was dried overnight at about 120° C. The dried mixture was broken up with a mortar and pestle and placed in a Coors Aluminaware tray. As before with Batch "A", Batch "B" was calcined under an oxygen atmosphere for 3 hours at about 970° C. The temperature was lowered to 500° C. and held for 1 hour before cooling to room temperature. This calcined batch was then broken up with a mortar and pestle and ground further using zirconia beads.

Batch "C" was prepared like "B" except that after calcining the batch was broken up using a stainless steel blender prior to grinding with zirconia beads.

A dispersion was prepared as follows: 6 g polyethylene (Holstalen Gur412), and 54 g of the above superconductive oxide powder were mixed with 114 g xylene in a resin kettle. The procedures described in EXAMPLE 3 for making homogeneous dispersion and spinning were followed closely. The ~0.6 mm-diameter, dried fibers are flexible. The dried fibers should be useful for magnetic shielding applications.

Small pieces (~8 cm long) were cut for oxygen firing according to the procedure and the cycle described in EXAMPLE 1. The fired fibers have a Jc of 67.1 amps/cm$^2$ at 77° K. A measurement of the Meissner effect shows that the fired fibers start to exclude magnetic flux at 93° K and exclude only 60% of the magnetic flux at 80° K.

EXAMPLE 7

A long piece (~45 cm) of the unfired fiber described in the EXAMPLE 6 was mounted in the Fisher #497 furnace according to the manner described in EXAMPLE 2. Except for the difference in T$_{max}$ (1000° C. vs. 925° C.), the firing cycle is identical to the one described in EXAMPLE 6. The fiber did not break during the entire cycle. With the higher firing temperature, the Jc at 77° K was improved (318 vs. 67.1 amps/cm$^2$ shown in EXAMPLE 6. The fiber shows a much sharper magnetic exclusion transition than the fired fibers prepared in EXAMPLE 6. It starts to exclude flux at 94° K and almost completely excludes the flux at 80° K. Although the Jc is improved with high temperature firing, it is still lower than the Jc of the fibers fired from the precursor/ polyethylene (see EXAMPLES 4 and 5). SEM photographs of the fracture surface of the fiber cross-section show a less dense structure compared with that of the sample described in EXAMPLE 4.

I claim:

1. A process for preparing a superconductive fiber of improved critical current density and consisting of MBa$_2$Cu$_3$ superconductive oxide where M is a metal selected from the group consisting of Y, Nd, Sm, Eu, Gd, Dy, Ho, Er, Tm, Yb and Lu, comprising the steps of:
   a) forming a spinnable dispersion of a chemically homogeneous particulate precursor of the superconductive oxide consisting essentially of an amorphous M compound, CuO and barium carbonate in proportions such that the atomic ratio of M:Ba:Cu is 1:2:3 in a solution of an organic polymer in an organic solvent, said dispersion containing at least 70 weight percent of particulate based on the total of polymer and particulate, wherein the particulate precursor is formed by blending an aqueous mixture of M acetate, copper acetate, and a source of barium selected from barium hydroxide and barium acetate, removing excess water, and calcining the product in air;
   b) extruding the dispersion into a fiber, and
   c) firing the fiber at a temperature of at least 950° C. to obtain a superconductive fiber.

2. A process according to claim 1 wherein M is yttrium.

3. A process according to claim 1 or 2 wherein the fiber is fired in oxygen.

4. A process according to claim 1 or 2 wherein firing is at a temperature above 1000° C.

* * * * *